(«12») United States Patent
Lee

(10) Patent No.: US 11,645,213 B2
(45) Date of Patent: *May 9, 2023

(54) DATA PROCESSING SYSTEM ALLOCATING MEMORY AREA IN HOST AS EXTENSION OF MEMORY AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,001

(22) Filed: Apr. 4, 2022

(65) Prior Publication Data

US 2022/0222188 A1 Jul. 14, 2022

Related U.S. Application Data

(60) Continuation of application No. 17/122,461, filed on Dec. 15, 2020, now Pat. No. 11,294,834, which is a division of application No. 16/367,974, filed on Mar. 28, 2019, now Pat. No. 10,877,909.

(30) Foreign Application Priority Data

Aug. 6, 2018 (KR) .................. 10-2018-0091319

(51) Int. Cl.
*G06F 13/16* (2006.01)
*G06F 3/06* (2006.01)
*G06F 13/42* (2006.01)

(52) U.S. Cl.
CPC ........ *G06F 13/1668* (2013.01); *G06F 3/0604* (2013.01); *G06F 3/0659* (2013.01); *G06F 3/0673* (2013.01); *G06F 13/4282* (2013.01); *G06F 2213/0016* (2013.01)

(58) Field of Classification Search
CPC .. G06F 13/1668; G06F 3/0604; G06F 3/0659; G06F 6/0673; G06F 13/4282
See application file for complete search history.

(56) References Cited

U.S. PATENT DOCUMENTS

2014/0380003 A1* 12/2014 Hsu ................. G06F 9/5033
718/102
2015/0378814 A1* 12/2015 Webb ................ G06F 3/0655
714/768
2016/0231946 A1* 8/2016 Gensler, Jr. ........... G06F 3/0683

\* cited by examiner

*Primary Examiner* — David E Martinez
(74) *Attorney, Agent, or Firm* — IP & T Group LLP

(57) ABSTRACT

A data processing system includes a memory system including a memory device storing data and a controller performing a data program operation or a data read operation with the memory device, and a host suitable for requesting the data program operation or the data read operation from the memory system. The controller can perform a serial communication to control a memory which is arranged outside the memory system and engaged with the host.

19 Claims, 13 Drawing Sheets

DATA PROCESSING SYSTEM ALLOCATING MEMORY AREA IN HOST AS EXTENSION OF MEMORY AND OPERATING METHOD THEREOF

CROSS-REFERENCE TO RELATED APPLICATIONS

The application is a continuation of U.S. patent application Ser. No. 17/122,461 filed on Dec. 15, 2020, which is a division of U.S. patent application Ser. No. 16/367,974 filed on Mar. 28, 2019 and issued as U.S. Pat. No. 10,877,909 on Dec. 29, 2020, which claims benefits of priority of Korean Patent Application No. 10-2018-0091319 filed on Aug. 6, 2018. The disclosure of each of the foregoing application is incorporated herein by reference in its entirety.

TECHNICAL FIELD

Exemplary embodiments of the invention relate to a data processing system, and more particularly, to a memory allocation method for a memory system including a plurality of dies.

BACKGROUND

Recently, a paradigm for a computer environment has shifted into ubiquitous computing, which enables a computer system to appear anytime and everywhere. The use of portable electronic devices such as mobile phones, digital cameras, notebook computers and the like are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. As an example of a memory system having such advantages, a data storage device may include a USB (Universal Serial Bus) memory device, a memory card having various interfaces, a solid state drive (SSD) or the like.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
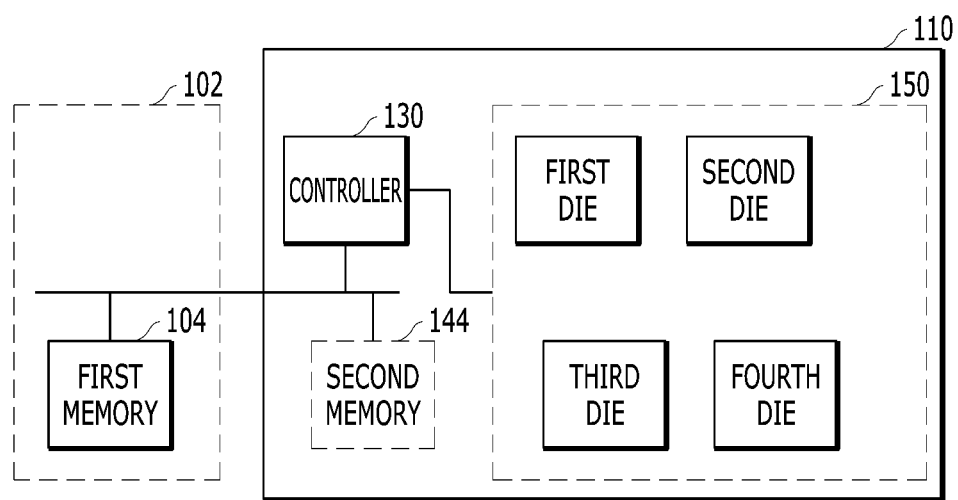
FIG. 1 is a block diagram illustrating an example of a data processing system including a memory system including plural dies in accordance with an embodiment of the disclosure.

Various examples of the disclosure are described below in more detail with reference to the accompanying drawings. The disclosure may be embodied in different other embodiments, forms and variations thereof and should not be construed as being limited to the embodiments set forth herein. Rather, the described embodiments are provided so that this disclosure will be thorough and complete, and will fully convey the disclosure to those skilled in the art to which this invention pertains. Throughout the disclosure, like reference numerals refer to like parts throughout the various figures and examples of the disclosure. It is noted that reference to "an embodiment" does not necessarily mean only one embodiment, and different references to "an embodiment" are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art and will not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure can provide a memory system, a data processing system, and an operation process or a method, which can quickly and reliably process data into a memory device by reducing operational complexity and performance degradation of the memory system and enhancing usage efficiency of the memory device.

Embodiments of the disclosure also provide a memory system, a data processing system, and an operating method thereof for dynamically controlling a memory allocation way to prepare a memory region having a size that varies depending on type information of die structure and the number of dies included in a memory device.

In an embodiment of the disclosure, a memory system can provide an apparatus and a method that can allocate, and use, not only a memory area or a component in the memory system but also a system memory area or a component belonging to a host engaged with the memory system.

In an embodiment, a data processing system can include a memory system including a memory device for storing data and a controller for performing a data program operation or a data read operation with the memory device, and a host suitable for requesting the data program operation or the data read operation from the memory system. The controller can perform a serial communication to control a first memory which is arranged outside the memory system and engaged with the host.

The serial communication is performed via at least one protocol of a MIPI M-PHY, a Universal Asynchronous Receiver Transmitter (UART), a Serial Peripheral Interface Bus (SPI) and an Inter Integrated Circuit (I2C).

In the serial communication, there are two types of operational entities: a master and a slave. By the way of example but not limitation, the controller can play a role as a master, and the first memory can play a role as a slave, in the serial communication.

In another example, the host can include a processor which plays a role as another master in the serial communication.

In an embodiment, the memory device can include a non-volatile memory device including a plurality of dies, each including a plurality of blocks, each including a plurality of pages including a plurality of cells storing the data. The controller can include a second memory for loading operation information required for the data program operation or the data read operation and mapping information of the memory device.

The operation information includes type information of die structure and the number of dies included in the non-volatile memory device.

For example, the second memory can include an allocated memory region for loading block management information, erase counts, valid page counts and mapping tables in the second memory, which may have different sizes determined according to the operation information. When all the block management information, the erase counts, the valid page counts and mapping tables are not loaded in the second memory having different sizes determined based on the operation information, the controller can allocate a part of the first memory to make up a shortage of the second memory.

The controller can load some of mapping information regarding a part of the non-volatile memory device in the second memory and the other mapping information in the first memory, based at least on the operation information.

By the way of example but not limitation, the type information of die structure includes one of a Single Die Package (SDP), a Double Die Package (DDP), a Quarter Die Package (QDP), and an Octet Die Package (ODP).

In another embodiment, a memory system can include a memory device including a plurality of dies, each including a plurality of blocks, each including a plurality of pages including a plurality of cells storing the data; and a controller suitable for performing a data program operation or a data read operation, requested from a host, with the memory device, and including a first memory for loading operation information required for the data program operation or the data read operation and mapping information of the memory device. After monitoring available storage capacity of the first memory, the controller can ask the host to use an additional memory area, which is included in the host, based on a monitoring result. The controller can handle the additional memory area as an extension of the first memory in response to host's resolution.

The controller can control the additional memory area via a serial communication. By way of example but not limitation, the serial communication may be performed via at least one protocol of a MIPI M-PHY, a Universal Asynchronous Receiver Transmitter (UART), a Serial Peripheral Interface Bus (SPI) and an Inter Integrated Circuit (I2C).

In the serial communication, the controller operates as a master, and the first memory plays a role as a slave. The operation information can include type information of die structure and the number of dies included in the non-volatile memory device. The second memory can include a memory region allocated for loading block management information, erase counts, valid page counts and mapping tables in the first memory, which can have different sizes determined according to the operation information.

In another embodiment, a method for operating a memory system can include loading operation information regarding a memory device including a plurality of dies, each including a plurality of blocks, each including a plurality of pages including a plurality of cells storing the data; monitoring available storage capacity of a first memory in a controller; asking a host to use an additional memory area based on a monitoring result; and controlling the additional memory area, which is included in the host, as an extension of the first memory in response to host's resolution.

By the way of example but not limitation, the controlling the additional memory area can include controlling a serial communication to manage the first memory and the additional memory area. The serial communication may be performed via at least one protocol of a MIPI M-PHY, a Universal Asynchronous Receiver Transmitter (UART), a Serial Peripheral Interface Bus (SPI) and an Inter Integrated Circuit (I2C). In the serial communication, the controller can play a role as a master, and the first memory can operate as a slave.

The operation information can include type information of die structure and the number of dies included in the non-volatile memory device. The second memory can include a memory region allocated for loading block management information, erase counts, valid page counts and mapping tables in the first memory can have different sizes determined according to the operation information.

In another embodiment, a data processing system can include a host including a first memory and suitable for providing a request for an operation, a memory device suitable for storing data, and a controller including a second memory and suitable for controlling the memory device to perform the operation in response to the request. The controller buffers data for the operation in the second memory. The controller stores, when the second memory becomes full with partial pieces of the data, remaining pieces of the data in the first memory. The controller and the first memory communicate with each other through a serial communication scheme.

Hereinafter, embodiments of the disclosure will be described in detail with reference to the accompanied drawings.

In FIG. 1, an example of a data processing system in accordance with an embodiment of the disclosure is described. The data processing system includes a memory system 110 and a host 102. The memory system 100 can include plural dies.

Referring to FIG. 1, in the data processing system, there are the memory system 110, which includes a non-volatile memory device, and the host 102 that is capable of using data stored in the memory system 110, in response to user's request. For example, if the host 102 is a computing device, the memory system 110 may be a storage device such as an SSD.

The host 102 may include at least one processor and at least one memory. The at least one memory included in the host 102 may include a first memory 104 including volatile memory cells. By way of example but not limitation, the first memory 104 may be implemented with one of memory devices such as DRAM, SRAM, and the like. If the host 102 is a computing device, the first memory 104 may be considered a system memory having a large storage capacity (e.g., several gigabytes).

The memory system 110 may include a controller 130 and a memory device 150. The memory device 150 may be a mass storage device including a plurality of dies. The controller 130 may use a second memory 144 to improve operational efficiency of instructions and data transmitted from the host 102. In accordance with an embodiment, the second memory 144 may be arranged inside the controller 130 or may be disposed outside the controller 130.

It is difficult to increase storage capacity of the memory system 110 after the memory system 110 is designed and manufactured. For example, while the memory device 150 has a structure that includes four dies, it is not possible to add another four dies into the memory device 150 while the memory system 110 having the memory device 150 is being used. Further, it is also difficult to increase the capacity of the second memory 144 after the memory system 110 is manufactured. However, in the case of the first memory 104, which is sort of a system memory included in the host 102, it is possible to increase its storage capacity when it is determined that more storage capacity is needed while a user uses the data processing system. For example, when the host 102 is a computing device, the first memory 104, which is system memory, can be designed to be removable, addable or replaceable. However, it is impossible to change an internal structure of the memory system 110 such as an SSD mounted on a computing device. In addition, when compared with a storage capacity of the first memory 104 included in the host 102, the storage capacity of the second memory 144 included in the memory system 110 is generally very small.

When the data processing system is faced with a difficulty in performing operations in response to user's request, it may be desirable for the user to extend the hardware of the host 102 and the memory system 110. However, extending the hardware of a conventional memory system may be difficult unless it is replaced. The memory system 110 and the host 102 in accordance with an embodiment of the disclosure can provide a method and an apparatus for allowing the controller 130 to use the first memory 104 included in the host 102 together with the second memory 144 disposed in the memory system 110.

The controller 130 can receive commands delivered from the host 102, and transmit data to the host 102, at a high speed. To this end, the controller 130 and host 102 may support serial communication. By way of example but not limitation, the serial communication can be performed or achieved via at least one protocol of the M-PHY of the Mobile Industry Processor Interface (MIPI), a Universal Asynchronous Receiver Transmitter (UART), a Serial Peripheral Interface Bus (SPI), an Inter Integrated Circuit (I2C).

When the memory system 110 can support specifications of the Universal Flash storage (UFS) and/or the embedded UFS (eUFS), the memory system 110 and the host 102 may use the M-PHY defining a physical layer protocol of high-speed serial data communication. In addition, the memory system 110 may support the Unified Protocol (UniPro) standard at a link layer.

In the serial communication, at least two entities (e.g., a master and a slave) are engaged with each other. For example, the controller 130 in the memory system 110 acts as a master and the first memory 104 in the host 102 can operate as a slave.

Figure 2:
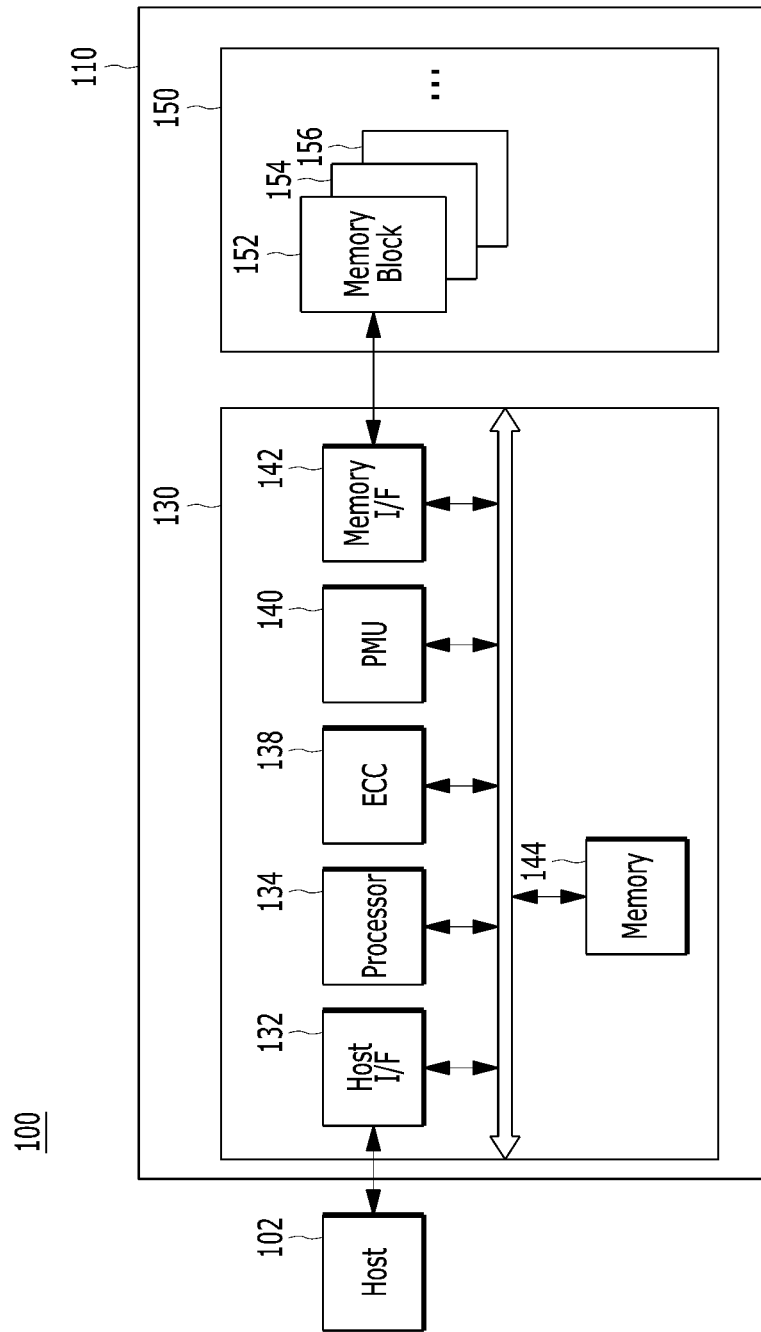
FIG. 2 is a block diagram illustrating an example of a data processing system including a memory system in accordance with an embodiment of the disclosure.

In FIG. 2, a data processing system 100 in accordance with an embodiment of the disclosure is described. Referring to FIG. 2, the data processing system 100 may include a host 102 engaged or interlocked with a memory system 110.

The host 102 may include, for example, a portable electronic device such as a mobile phone, an MP3 player and a laptop computer or an electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmits a plurality of commands corresponding to the user's requests into the memory system 110, thereby performing operations corresponding to commands within the memory system 110. Handling plural commands in the memory system 110 is described below, referring to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in the various types of memory systems as exemplified above.

By way of example but not limitation, the controller 130 and the memory device 150 may be integrated into a single semiconductor device. The controller 130 and memory device 150 configuring an SSD may be integrated into a single semiconductor device, for improving an operation speed. When the memory system 110 is used as an SSD, the operating speed of the host 102 connected to the memory system 110 can be improved more than that of the host 102 implemented with a hard disk. In addition, the controller 130 and the memory device 150 integrated into one semiconductor device may form a memory card. For example, a PC card (PCMCIA), a compact flash card (CF), a memory card such as a smart media card (SM, SMC), a memory sticks, a multimedia card (MMC, RS-MMC, MMCmicro), a SD card (SD, miniSD, microSD, SDHC), a universal flash memory and the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156. Each of the memory blocks 152, 154, 156 may include a plurality of pages. Each of the plurality of pages may include a plurality of memory cells to which a plurality of word lines (WL) are electrically coupled. The memory device 150 also includes a plurality of memory dies each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program, and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction circuit (ECC) 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface unit 132 is a component for exchanging data with the host 102, which may be implemented through a firmware called a host interface layer (HIL).

The ECC 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC 138 can determine whether the error correction decoding has succeeded and output an instruction signal (e.g., a correction success signal or a correction fail signal). The ECC 138 can use the parity bit which is generated during the ECC encoding process, for correcting the error bit of the read data. When the number of the error bits is greater than or equal to a threshold number of correctable error bits, the ECC 138 may not correct error bits but may output an error correction fail signal indicating failure in correcting the error bits.

The ECC 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC 138 may include all or some of circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface unit 142 can provide an interface for handling commands and data between the controller 130 and the memory device 150, for example, operations of NAND flash interface, in particular, operations between the controller 130 and the memory device 150. In accordance with an embodiment, the memory interface unit 142 can be implemented through a firmware called a Flash Interface Layer (FIL) as a component for exchanging data with the memory device 150.

The memory 144 may support operations performed by the memory system 110 and the controller 130. The memory 144 may store temporary or transactional data for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 exemplifies the second memory 144 disposed within the controller 130, the embodiment is not limited thereto. That is, the memory 144 may be located inside or outside the controller 130. For instance, the memory 144 may be embodied by an external volatile memory having a memory interface transferring data and/or signals transferred between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute a firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, for performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to a command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation (e.g., a garbage collection (GC) operation) for copying and storing data stored in an arbitrary memory block among the memory blocks 152, 154, 156 in the memory device 150 to another arbitrary memory block. The background operation can include an operation (e.g., a wear leveling (WL) operation) to move or swap between data stored in at least one of the memory blocks 152, 154, 156 in memory device 150 to at least another of the memory blocks 152, 154, 156. As the background operation, the controller 130 uses the processor 134 for storing the map data stored in the controller 130 to at least one of the memory blocks 152, 154, 156 in the memory device 150, e.g., a map flush operation. A bad block management operation for checking bad blocks in the plurality of memory blocks 152, 154, 156 included in the memory device 150 is one of other background operation examples performed by the processor 134.

In accordance with an embodiment, the controller 130 and the second memory 144 shown in FIG. 1 may be implemented through at least one processor 134 and at least one memory 144 in the controller 130 described in FIG. 2.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) in a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine each channel or each way as one of a busy state, a ready state, an active state, an idle state, a normal state and/or an abnormal state. Controller's determination of which channel or way an instruction (and/or a data) is delivered through can be associated with a physical block address, e.g., which die(s) the instruction (and/or the data) is delivered to. The controller 130 can refer to descriptors delivered from the memory device 150. The descriptors can include a block or page of parameters that describe something about the memory device 150, which is a data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks included in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
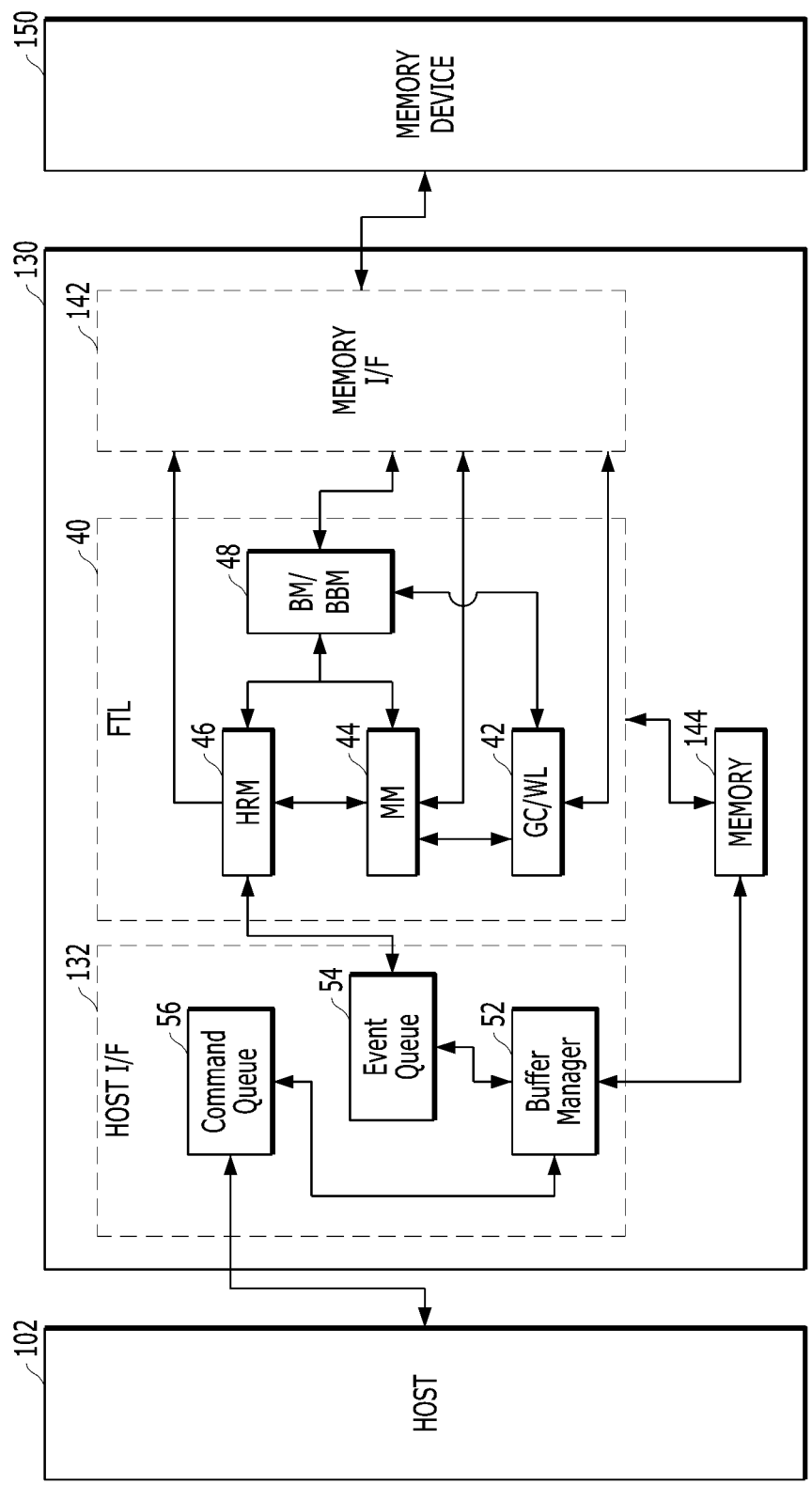
FIG. 3 is a block diagram illustrating an example of a memory system in accordance with an embodiment of the disclosure.

Referring to FIG. 3, a controller in a memory system in accordance with another example of the disclosure is described in detail. The controller 130 cooperates with the host 102 and the memory device 150. The controller 130 can include a host interface unit 132, a flash translation layer (FTL) unit 40, a memory interface unit 142 and a memory 144.

Although not shown in FIG. 3, in accordance with an embodiment, the ECC 138 described in FIG. 2 may be included in the flash translation layer (FTL) unit 40. In another embodiment, the ECC 138 may be implemented as a separate module, a circuit, a firmware or the like, which is included in, or associated with, the controller 130.

The host interface unit 132 is for handling commands, data, and the like transmitted from the host 102. By way of example but not limitation, the host interface unit 132 can include a command queue 56, a buffer manager 52 and an event queue 54. The command queue 56 can sequentially store commands, data, and the like transmitted from the host 102 and output them to the buffer manager 52 in a stored order. The buffer manager 52 can classify, manage or adjust the commands, the data, and the like, which are delivered from the command queue 56. The event queue 54 can sequentially transmit events for processing the commands, the data, and the like transmitted from the buffer manager 52.

A plurality of commands or data of the same characteristic may be continuously transmitted from the host 102, or commands and data of different characteristics may be transmitted to the memory system 110 after being mixed or jumbled. For example, a plurality of commands for reading data (read commands) may be delivered, or commands for reading data (read command) and programming/writing data (write command) may be alternately transmitted to the memory system 110. The host interface unit 132 can store commands, data, and the like, which are transmitted from the host 102, to the command queue 56 sequentially. Thereafter, the host interface unit 132 can estimate or predict what type of operation the controller 130 will perform according to the characteristics of the command, data, etc., which is transmitted from the host 102. The host interface unit 132 can determine a processing order and a priority of commands, data and the like, based at least on their characteristics. According to characteristics of commands, data, and the like transmitted from the host 102, the buffer manager 52 in the host interface unit 132 is configured to determine whether commands, data, and the like are stored in the memory 144, or whether the commands, the data, and the like are delivered into the flash translation layer (FTL) unit 40. The event queue 54 receives events, entered from the buffer manager 52, which are to be internally executed and processed by the memory system 110 or the controller 130 in response to the commands, the data, etc., transmitted from the host 102, so as to deliver the events into the flash translation layer (FTL) unit 40 in the order received.

In accordance with an embodiment, the host interface unit 132 described in FIG. 3 may perform the functions of the controller 130 described in FIG. 1. The host interface unit 132 may set the first memory 104 included in the host 102 as a slave and add the first memory 104 as an additional storage space which is controllable or usable by the controller 130.

In accordance with an embodiment, the flash translation layer (FTL) unit 40 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection or wear leveling. The block manager 48 can execute commands or instructions onto a block in the memory device 150.

By way of example but not limitation, the host request manager (HRM) 46 can use the map manager (MM) 44 and the block manager 48 to handle or process requests according to the read and program commands and events which are delivered from the host interface unit 132. The host request manager (HRM) 46 can send an inquiry request to the map data manager (MM) 44, to figure out a physical address corresponding to the logical address which is entered with the events. The host request manager (HRM) 46 can send a read request with the physical address to the memory interface unit 142, to process the read request (handle the events). On the other hand, the host request manager (HRM) 46 can send a program request (write request) to the block manager 48, to program entered data to a specific page of the unrecorded (no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests to the multiple-plane and one-shot program operations to the memory interface unit 142. It can be plausible that the block manager 48 sends several flash program requests to the memory interface unit 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least valid page when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine the validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface unit 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 may not perform the mapping table update. It is because the map request is issued with old physical information if the status manger 42 requests a map update, then a valid page copy is completed later. The map manager 44 may perform a map update operation to ensure accuracy only if the latest map table still points to the old physical address.

The memory device 150 can include a plurality of memory blocks. The plurality of memory blocks can be classified into different types of memory blocks such as a single level cell (SLC) memory block, a multi level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity in the same space than the SLC memory block. The MLC memory block can be highly integrated in a view of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. But, the memory device 150 may be implemented by at least one of a phase change random access memory (PCRAM), a ferroelectrics random access memory (FRAM), a spin injection magnetic memory (SU-RAM), and a spin transfer torque magnetic random access memory (STT-MRAM), or the like.

Figure 4:
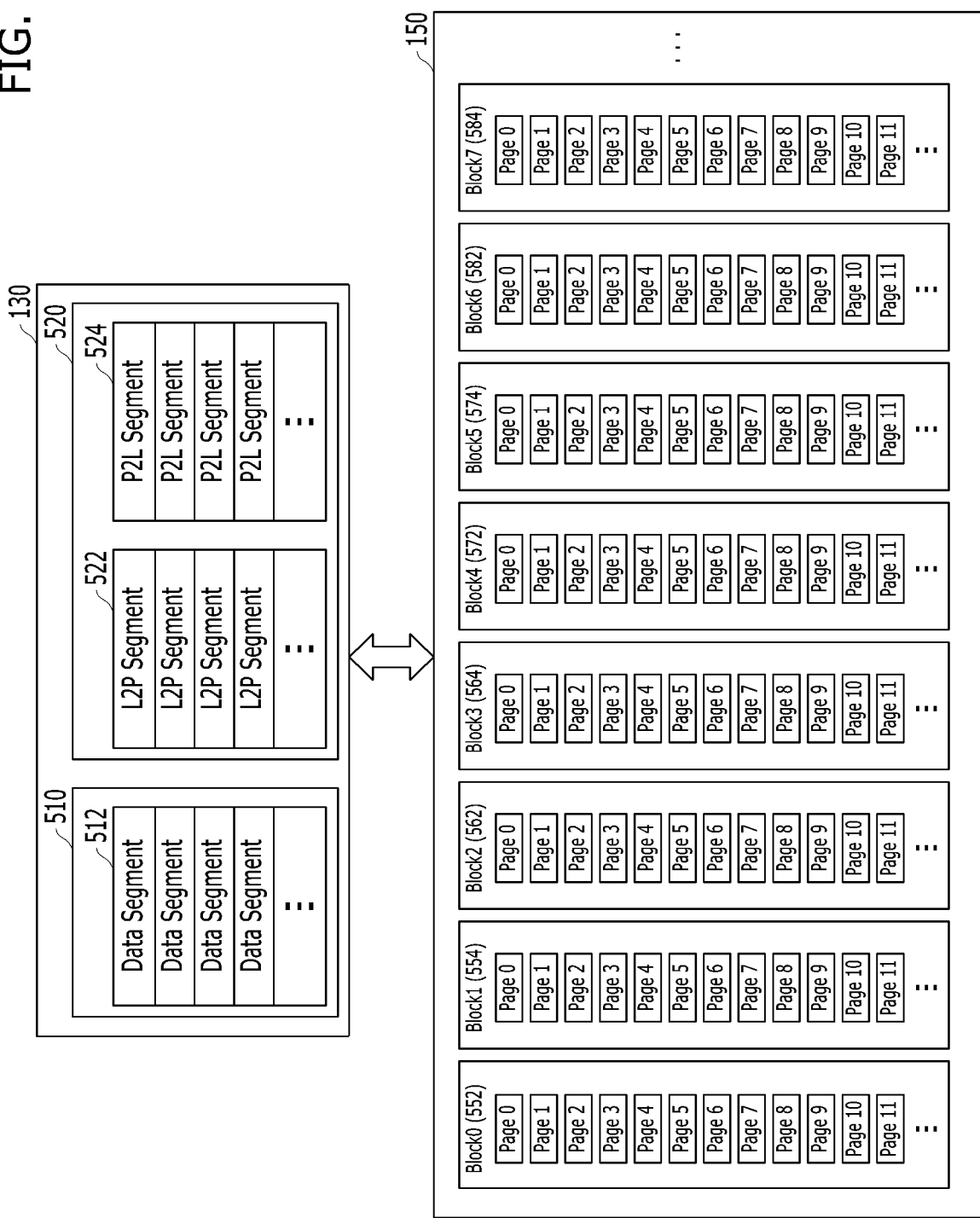
FIGS. 4 and 5 are diagrams illustrating an example in which a memory system in accordance with an embodiment of the disclosure performs a plurality of command operations corresponding to a plurality of commands.
Figure 5:
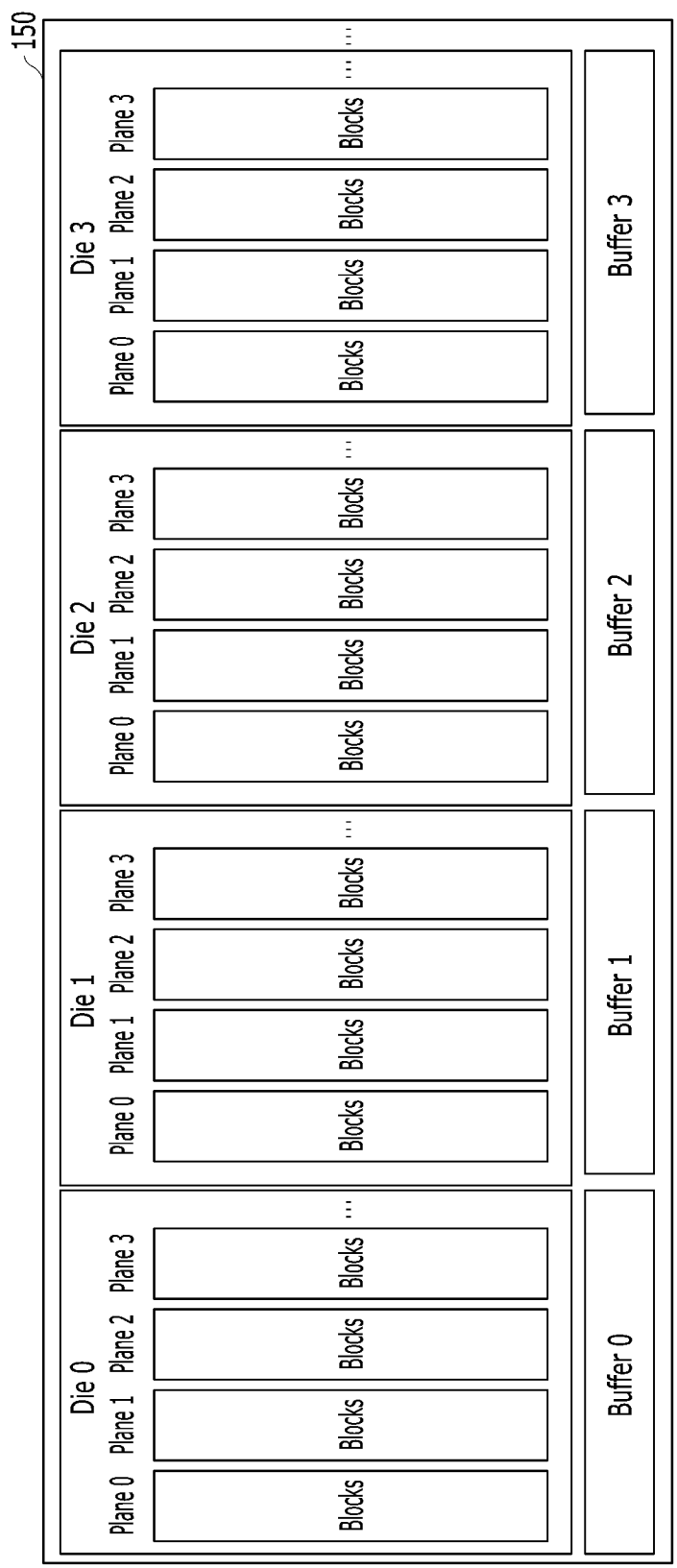

FIGS. 4 and 5 schematically describe an example of performing a plurality of command operations corresponding to a plurality of commands in the memory system in accordance with an embodiment of the disclosure. For example, in the embodiment of the disclosure, detailed descriptions will be made for a data processing operation in a case where a plurality of write commands are received from the host 102 and program operations corresponding to the write commands are performed, in a case where a plurality of read commands are received from the host 102 and read operations corresponding to the read commands are performed, in a case where a plurality of erase commands are received from the host 102 and erase operations corresponding to the erase commands are performed, or in a case where a plurality of write commands and a plurality of read commands are received together from the host 102 and program operations and read operations corresponding to the write commands and the read commands are performed.

Moreover, in the embodiment of the disclosure, descriptions will be made by taking as an example a case where: write data corresponding to a plurality of write commands entered from the host 102 are stored in the buffer/cache included in the memory 144 of the controller 130, the write data stored in the buffer/cache are programmed to and stored in the plurality of memory blocks included in the memory device 150, map data are updated corresponding to the stored write data in the plurality of memory blocks, and the updated map data are stored in the plurality of memory blocks included in the memory device 150. In the embodiment of the disclosure, descriptions will be made by taking as an example a case where program operations corresponding to a plurality of write commands entered from the host 102 are performed. Furthermore, in the embodiment of the disclosure, descriptions will be made by taking as an example a case where: a plurality of read commands are entered from the host 102 for the data stored in the memory device 150, data corresponding to the read commands are read from the memory device 150 by checking the map data of the data corresponding to the read commands, the read data are stored in the buffer/cache included in the memory 144 of the controller 130, and the data stored in the buffer/cache are provided to the host 102. In other words, in the embodiment of the disclosure, descriptions will be made by taking as an example a case where read operations corresponding to a plurality of read commands entered from the host 102 are performed. In addition, in the embodiment of the disclosure, descriptions will be made by taking as an example a case where: a plurality of erase commands are received from the host 102 for the memory blocks included in the memory device 150, memory blocks are checked corresponding to the erase commands, the data stored in the checked memory blocks are erased, map data are updated corresponding to the erased data, and the updated map data are stored in the plurality of memory blocks included in the memory device 150. Namely, in the embodiment of the disclosure, descriptions will be made by taking as an example a case where erase operations corresponding to a plurality of erase commands received from the host 102 are performed.

Further, while, in the embodiment of the disclosure, it will be described below as an example that the controller 130 performs command operations in the memory system 110. It is to be noted that, as described above, the processor 134 included in the controller 130 may perform command operations in the memory system 110, through, for example, an FTL (flash translation layer). Also, in the embodiment of the disclosure, the controller 130 programs and stores user data and metadata corresponding to write commands entered from the host 102, in arbitrary memory blocks among the plurality of memory blocks included in the memory device 150, reads user data and metadata corresponding to read commands received from the host 102, from arbitrary memory blocks among the plurality of memory blocks included in the memory device 150, and provides the read data to the host 102, or erases user data and metadata, corresponding to erase commands entered from the host 102, from arbitrary memory blocks among the plurality of memory blocks included in the memory device 150.

Metadata may include first map data including a logical/physical (L2P: logical to physical) information (hereinafter, referred to as a 'logical information') and second map data including a physical/logical (P2L: physical to logical) information (hereinafter, referred to as a 'physical information'), for data stored in memory blocks corresponding to a program operation. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all remaining information and data excluding user data corresponding to a command received from the host 102.

In the embodiment of the disclosure, in the case where: the controller 130 receives a plurality of write commands from the host 102, program operations corresponding to the write commands are performed, and user data corresponding to the write commands are written and stored in empty memory blocks, open memory blocks or free memory blocks among the memory blocks of the memory device 150, for which an erase operation has been performed. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks among the memory blocks of the memory device 150.

Here, in the case where write commands are entered from the host 102, the controller 130 writes and stores user data corresponding to the write commands in memory blocks. The controller 130 stores, in other memory blocks, metadata including first map data and second map data for the user data stored in the memory blocks. Particularly, corresponding to the data segments of the user data which are stored in the memory blocks of the memory device 150, the controller 130 generates and updates the L2P segments of first map data and the P2L segments of second map data as the map segments of map data among the meta segments of metadata. The controller 130 stores the map segments in the memory blocks of the memory device 150. The map segments stored in the memory blocks of the memory device 150 are loaded in the memory 144 included in the controller 130 and are then updated.

Further, in the case where a plurality of read commands are received from the host 102, the controller 130 reads read data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In addition, in the case where a plurality of erase commands are received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache included in the memory 144 of the controller 130, then stores the data, that is, the metadata and the user data, in the memory device 150. Herein, by way of example but not limitation, the background operation may include a garbage collection operation or a read reclaim operation as a copy operation, a wear leveling operation as a swap operation or a map flush operation. For instance, for the background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, then store the metadata and user data, in certain other memory blocks of the memory device 150.

In the memory system in accordance with the embodiment of the disclosure, in the case of performing command operations as foreground operations, and a copy operation, a swap operation and a map flush operation as background operations, the controller 130 schedules queues corresponding to the foreground operations and the background operations and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in accordance with the embodiment of the disclosure, identifiers are assigned not only by respective operations for the memory device 150 but also by functions for the memory device 150, and queues corresponding to the functions assigned with respective identifiers are scheduled.

In the memory system in accordance with the embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system in accordance with the embodiment of the disclosure, after memory regions corresponding to the queues scheduled by identifiers are allocated to the memory 144 included in the controller 130 and the memory included in the host 102, the controller 130 manages addresses for the allocated memory regions. The controller 130 performs not only the foreground operation and the background operation but also respective functions and operations in the memory device 150, by using the scheduled queues.

Referring to FIG. 4, the controller 130 performs command operations corresponding to a plurality of commands entered from the host 102, for example, program operations corresponding to a plurality of write commands entered from the host 102. At this time, the controller 130 programs and stores user data corresponding to the write commands, in memory blocks of the memory device 150. Also, corresponding to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages included in the memory blocks of the memory device 150. That is, the controller 130 generates and updates L2P segments as the logical segments of the first map data and P2L segments as the physical segments of the second map data, then stores the logical and physical segments in pages included in the memory blocks of the memory device 150.

For example, the controller 130 caches and buffers the user data corresponding to the write commands entered from the host 102, in a first buffer 510 included in the memory 144 of the controller 130. Particularly, after storing data segments 512 of the user data in the first buffer 510 working as a data buffer/cache, the controller 130 stores the data segments 512 stored in the first buffer 510 in pages included in the memory blocks of the memory device 150. As the data segments 512 of the user data corresponding to the write commands received from the host 102 are programmed to and stored in the pages included in the memory blocks of the memory device 150, the controller 130 generates and updates the first map data and the second map data. The controller 130 stores the map data in a second buffer 520 included in the memory 144 of the controller 130. Particularly, the controller 130 stores L2P segments 522 of the first map data and P2L segments 524 of the second map data for the user data, in the second buffer 520 as a map buffer/cache. As described above, the L2P segments 522 of the first map data and the P2L segments 524 of the second map data may be stored in the second buffer 520 of the memory 144 in the controller 130. A map list for the L2P segments 522 of the first map data and another map list for the P2L segments 524 of the second map data may be stored in the second buffer 520. The controller 130 stores the L2P segments 522 of the first map data and the P2L segments 524 of the second map data, which are stored in the second buffer 520, in pages included in the memory blocks of the memory device 150.

Also, the controller 130 performs command operations corresponding to a plurality of commands received from the host 102, for example, read operations corresponding to a plurality of read commands received from the host 102. Particularly, the controller 130 loads L2P segments 522 of first map data and P2L segments 524 of second map data as the map segments of user data corresponding to the read commands, in the second buffer 520, and checks the L2P segments 522 and the P2L segments 524. Then, the controller 130 reads the user data stored in pages of corresponding memory blocks among the memory blocks of the memory device 150, stores data segments 512 of the read user data in the first buffer 510, then provides the data segments 512 to the host 102.

Furthermore, the controller 130 performs command operations corresponding to a plurality of commands entered from the host 102, for example, erase operations corresponding to a plurality of erase commands entered from the host 102. In particular, the controller 130 checks memory blocks corresponding to the erase commands among the memory blocks of the memory device 150 to carry out the erase operations for the checked memory blocks.

In the case of performing an operation of copying data or swapping data among the memory blocks included in the memory device 150, for example, a garbage collection operation, a read reclaim operation or a wear leveling operation, as a background operation, the controller 130 stores data segments 512 of corresponding user data, in the first buffer 510, loads map segments 522, 524 of map data corresponding to the user data, in the second buffer 520, and then performs the garbage collection operation, the read reclaim operation or the wear leveling operation. In the case of performing a map update operation and a map flush operation for metadata, e.g., map data, for the memory blocks of the memory device 150 as a background operation, the controller 130 loads the corresponding map segments 522, 524 in the second buffer 520, and then performs the map update operation and the map flush operation.

As aforementioned, in the case of performing functions and operations including a foreground operation and a background operation for the memory device 150, the controller 130 assigns identifiers by the functions and operations to be performed for the memory device 150. The controller 130 schedules queues respectively corresponding to the functions and operations assigned with the identifiers, respectively. The controller 130 allocates memory regions corresponding to the respective queues, to the memory 144 included in the controller 130 and the memory included in the host 102. The controller 130 manages the identifiers assigned to the respective functions and operations, the queues scheduled for the respective identifiers and the memory regions allocated to the memory 144 of the controller 130 and the memory of the host 102 corresponding to the queues, respectively. The controller 130 performs the functions and operations for the memory device 150, through the memory regions allocated to the memory 144 of the controller 130 and the memory of the host 102.

Referring to FIG. 5, the memory device 150 includes a plurality of memory dies, for example, a memory die 0, a memory die 1, a memory die 2 and a memory die 3, and each of the memory dies includes a plurality of planes, for example, a plane 0, a plane 1, a plane 2 and a plane 3. The respective planes in the memory dies included in the memory device 150 include a plurality of memory blocks, for example, N number of blocks Block0, Block1, . . . , BlockN−1 each including a plurality of pages, for example, $2^M$ number of pages, as described above with reference to FIG. 3. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers included in the memory device 150. For example, in the case of performing program operations, data corresponding to the program operations are stored in the buffers, and are then stored in the pages included in the memory blocks of the memory dies. In the case of performing read operations, data corresponding to the read operations read from the pages included in the memory blocks of the memory dies, are stored in the buffers, and are then provided to the host 102 through the controller 130.

In the embodiment of the disclosure, while it will be described below as an example that the buffers included in the memory device 150 exist outside the respective corresponding memory dies, it is to be noted that the buffers may exist inside the respective corresponding memory dies, and it is to be noted that the buffers may correspond to the respective planes or the respective memory blocks in the respective memory dies. Further, in the embodiment of the disclosure, while it will be described below as an example that the buffers included in the memory device 150 are the plurality of page buffers 322, 324 and 326 included in the memory device 150 as described above with reference to FIG. 3, it is to be noted that the buffers may be a plurality of caches or a plurality of registers included in the memory device 150.

Also, the plurality of memory blocks included in the memory device 150 may be grouped into a plurality of super memory blocks, and command operations may be performed in the plurality of super memory blocks. Each of the super memory blocks may include a plurality of memory blocks, for example, memory blocks included in a first memory block group and a second memory block group. In this regard, in the case where the first memory block group is included in the first plane of a certain first memory die, the second memory block group may be included in the first plane of the first memory die, be included in the second plane of the first memory die, or be included in the planes of a second memory die.

In an embodiment of the disclosure, a data processing system may include plural memory systems. Each of the plural memory systems 110 can include the controller 130 and the memory device 150. In the data processing system, one of the plural memory systems 110 can be a master and the others can be a slave. The master may be determined based on contention between the plural memory systems 110. When a plurality of commands is delivered from the host 102 in the data processing system, the master can determine a destination of each command based at least on statuses of channels or buses. For example, a first memory system can be determined as a master memory system among a plurality of memory systems, corresponding to information delivered from the plurality of memory systems. If the first memory system is determined to be the master memory system, the remaining memory systems are considered slave memory systems. A controller of the master memory system can check statuses of a plurality of channels (or ways, buses) coupled to a plurality of memory systems, to select which memory system handles commands or data delivered from the host 102. In an embodiment, a master can be dynamically determined among the plural memory systems. In another embodiment, a master memory system may be changed with one of the other slave memory systems periodically or according to an event.

Hereinafter, a method and apparatus for transferring data in the memory system 110 including the memory system 150 and the controller 130 described above will be described in more detail. As the amount of data stored in the memory system 110 becomes larger, the memory system 110 may be required to read or store large amounts of data at a time. However, a read time for reading a data stored in the memory device 150 or a program/write time for writing a data in the memory device 150 may be generally longer than a handling time for the controller 130 to process a data, or a data transmission time between the controller 130 and the memory system 150. For example, the read time might be twice that of the handling time. Since the read time or the program time is relatively longer than the handling time or the data transmission time, a procedure or a process for delivering data in the memory system 110 may affect performance of the memory system 110, e.g., an operation speed and/or structure (e.g., a buffer size) of the memory system 110.

Figure 6:
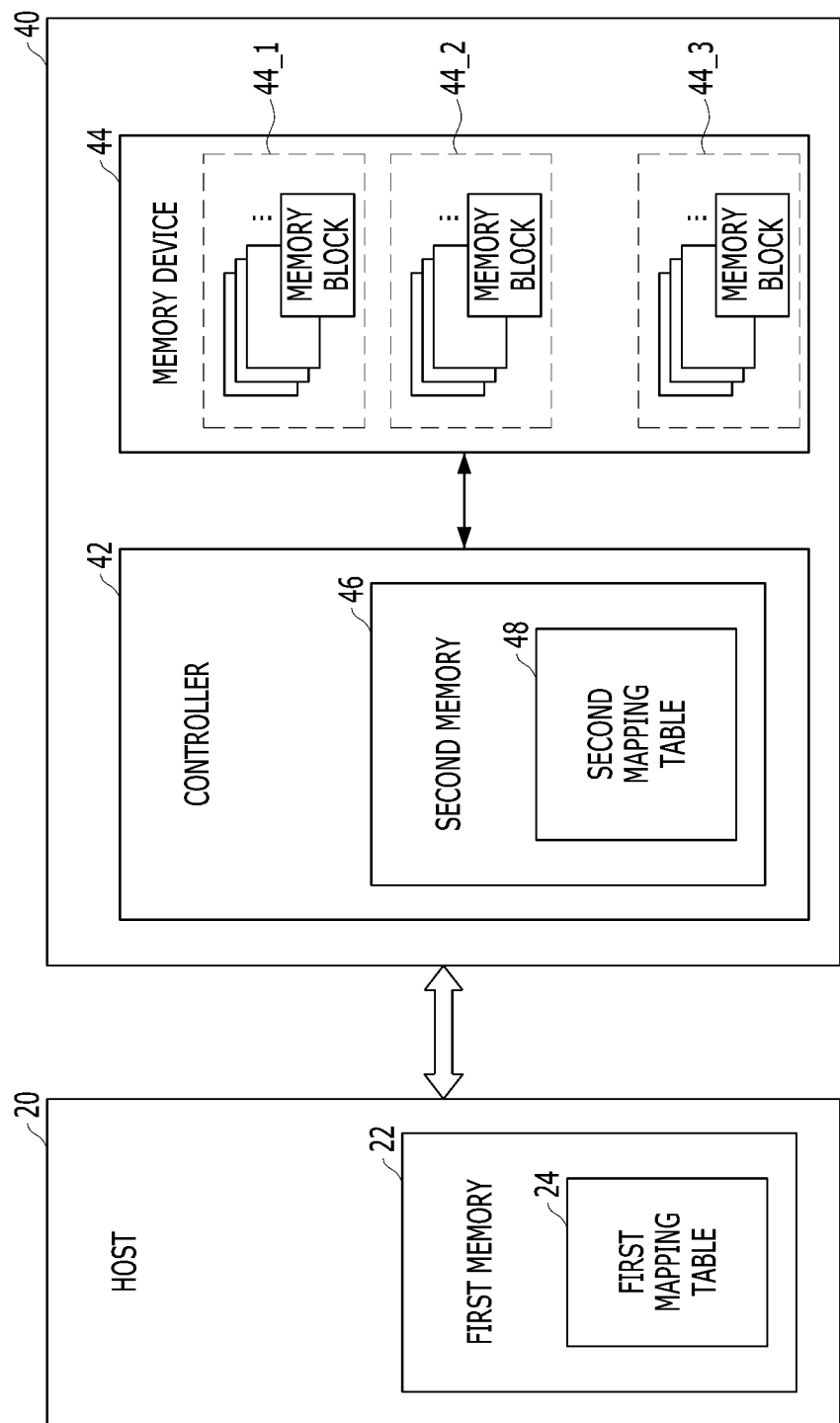
FIG. 6 is a block diagram illustrating a data processing system in accordance with an embodiment of the disclosure.

In FIG. 6, a host 42 and a memory system 40 in accordance with an embodiment of the disclosure are described. The host 20, the memory system 40 and other components can be constituted as a data processing system in accordance with an embodiment of the disclosure.

Referring to FIG. 6, the host 20 and the memory system 40 are shown in the data processing system. The host 20 can request the memory system 40 to perform a command operation such as a data program operation or a data read operation. The host 20 can include a first memory 22 storing a first mapping table 24. The memory system 40 can include a controller 42 performing the data program operation or the data read operation with a memory device 44. The memory device 44 is capable of storing data. The memory device 44 can include a plurality of dies 44_1 to 44_3, each of which includes plural memory blocks. An internal configuration of the memory device 44 can be varied or changed based at least on the characteristic of the memory device 44, the purpose for which the memory system 40 is used, or the specification of the memory system 40, which is required by the host 20. By way of example but not limitation, the memory device 150 illustrated in FIGS. 1 to 5 and the memory device 40 shown in FIG. 6 may include substantially similar components.

The controller 42 may include a second memory 42 for storing or loading a second mapping table 48. The controller 42 may use the second mapping table 48 to find or load the operation information required for the data program operation or the data read operation, and mapping information of the memory device 44. Further, although not shown, the controller 42 may include at least one processor, a host interface, and a controller interface. The processor can be for command operations within the controller 42. The processor may be similar to a CPU embedded or used in a computing device. The host interface may handle data communication between the memory system 40 and the host 20. The controller interface is for data communication between the memory device 44 and the controller 42. The second memory 42 may include a buffer and may temporarily store required data and operational status during operation of the processor, the host interface, and the controller interface. For example, the second memory 42 may temporarily store an input/output (I/O) data transferred between the memory device 44 and the host 20. An internal configuration of the above-described controller 42 may be described based on functional classification according to an operation, a task, and the like that the controller 42 can process or handle.

In accordance with an embodiment, configuration or structure of the controller 42 may include several components: at least one processor, at least one memory, at least one input/output port, and a wire for electrical connection between the components.

While the storage capacity of the memory device 44 is increased, it may be difficult to store system information, map information, operation state information, and the like, which are required for operations, e.g., reading, programming, and erasing a plurality of dies 44_1, 44_2, 44_3 a plurality of blocks, and a plurality of pages included in the memory device 44, in the controller 42 (particularly, in the second memory 46). Thus, the system information, the map information, the operational status information, and the like for operations such as reading, programming, erasing, etc., as well as user data are stored in the memory device 44. The controller 42 can read and load some or parts of the system information, the map information, the operational status information, and the like regarding a plurality of dies 44_1 to 44_3, on an ad hoc basis. After the corresponding operation is completed, the controller 42 can store loaded information to the memory device 44 again.

Information necessary for performing operations may include block management information, an erase count, a valid page count, and a mapping table. Such information may vary in size depending on operation information including type information of die structure and the number of dies which are included in the memory device 44. When the second memory 46 does not have enough capacity to store the information necessary for performing operations, the controller 42 may fail to load all the block management information, the erase count, the valid page count, and the mapping table into the second memory 46 in accordance with the operation information of the memory device 44.

In such a case, the controller 42 may control the first memory 22 linked with the host 20 as an additional memory via a serial communication, in order to further allocate the first memory 22 onto which necessary information is to be loaded. In other words, when the controller 42 fails to allocate a sufficient portion of the second memory 46 to load all the block management information, the erase count, the valid page count, and the mapping table having a large size which vary according to the operation information of the memory device 44, it is possible for the controller 42 to further allocate a part of the first memory 22 for additional capacity to store the information necessary for performing operations. Then, the controller 42 may load some of the mapping information of the memory device 44 onto the second memory 46 according to the operation information. Remaining pieces of the mapping information of the memory device 44 may be loaded onto the first memory 22.

For the serial data communication, the host 20 and the memory system 40 can use at least one protocol of the MIPI M-PHY, the Universal Asynchronous Receiver Transmitter (UART), the Serial Peripheral Interface Bus (SPI), the Inter Integrated Circuit (I2C), and the Universal Serial Bus (USB). The serial data communication is generally carried out between at least two different entities: a master and a slave.

To perform the serial communication, the controller 42 may operate as a master, and the first memory 22 may act as a slave. Generally, the host 20 is considered a master and the memory device 44 can be a slave, since the host 20 requests the memory system 40 to perform a data program operation or a data read operation (i.e., the memory system 40 works in response to the request of the host 20). However, in an embodiment, the controller 42 can selectively use the first memory 22 and the second memory 46 in accordance with the operation information of the memory device 44 so that the controller 42 can control the first memory 22 and the second memory 46. Thus, the first memory 22, which is interlocked with the host 20, can be a slave in the serial communication.

The type information of die structure includes one of Single Die Package (SDP), Quarter Die Package (QDP), and Octet Die Package (ODP) depending on how many dies are included in the memory device 44. Herein, SDP means one die, DDP means two dies, QDP means four dies, and ODP means eight dies, in the memory device 44.

Although not shown, as the number of memory cells capable of storing data in the memory device 44 increases, the internal structure of the memory device 44 becomes complex as described in FIG. 6. The controller 42 may transmit or receive connection information according to the internal configuration of the memory device 44 together with the data. For example, in a case when a plurality of dies 44_1 to 44_3 are included in the memory device 44 as shown in FIG. 6, there are n channels and m ways (each of n and m is an integer larger than 1) between the controller 42 and the memory device 44. The data and the connection information may be transferred via the n channels and the m ways. However, in order for the controller 42 to read or write data to the memory device 44, additional control variables or control signals may be needed depending on the internal structure of the memory device 44. As more dies are included in the memory device 44, additional information required for performing operations.

As described above, the data processing system in accordance with an embodiment includes the host 20 that requests a data program operation and/or a data read operation to the controller 42, the memory device 44 that stores and outputs data, and the controller 42 that performs the data program operation and/or the data read operation with the memory device 44. Here, the controller 42 can control or use the first memory 22, interlocked with the host 20 and disposed outside the memory system 40, via a serial communication method, to perform the data program operation and/or the data read operation.

Figure 7:
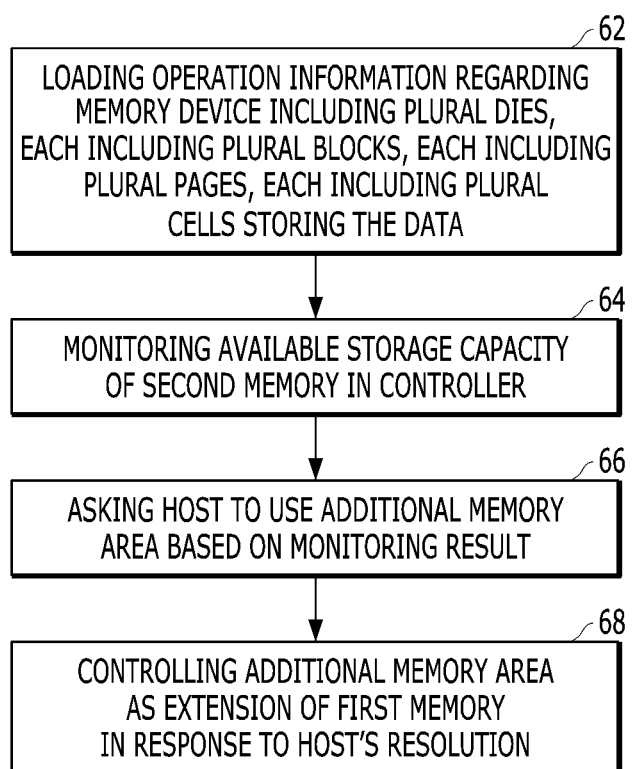
FIG. 7 is a flowchart illustrating an operation method of a data processing system in accordance with an embodiment of the disclosure.

In FIG. 7, a method of operating the data processing system in accordance with an embodiment of the disclosure is described.

Referring to FIG. 7, the operation method of the data processing system includes step 62 of loading operation information regarding the memory device 44 including the plurality of dies 44_1 to 44_3, each including a plurality of blocks, each including a plurality of pages, each including a plurality of cells storing the data, step 64 of monitoring available storage capacity of the second memory 46 in the controller 42, step 66 of requesting the host 20 to use an additional memory area based on the monitoring result, and step 68 of controlling the additional memory area for the second memory 46 in response to the request made to the host 20.

In the data processing system, the memory system 40 can handle or process commands, data, and the like through interworking with the host 20. To this end, the controller 42 in the memory system 40 can collect and utilize operation information regarding the memory device 44 included in the memory system 40. For example, the controller 42 can collect the operation information regarding the memory device 44 and store or load collected information into the second memory 46 inside the controller 46 or the first memory 22 associated with the controller 46 at step 62. After collecting or recognizing operation information about the memory device 44 or the second memory 46 (e.g., information regarding available resources), the controller 42 can distribute or allocate available resources to perform an operation according to characteristics of the operations which can be determined by commands, data, or the like transmitted from the host 20. When the controller 46 has enough available resources within the second memory 46, there might be no problem for operations handling the commands and/or the data transmitted from the host 20. However, if the controller 42 does not have enough resources within the second memory 46, the controller 42 can ask or request additional resources (e.g., memory area) from the host 20.

For this purpose, the controller and the host can support a serial data communication performed via at least one protocol of the MIPI M-PHY, the Universal Asynchronous Receiver Transmitter (UART), the Serial Peripheral Interface Bus (SPI), the Inter Integrated Circuit (I2C) and the like. In the serial communication, the controller 42 can act as a master to manage the available resources of the host 20. The first memory 22, which is at least a part of the system memory of the host 20, may be worked as a slave to handle the request from the controller 42. The controller 42 reserves a part of the system memory of the host 20 and can utilize it as a resource for processing commands and data of the host 20.

In accordance with an embodiment, both the controller 42 of the memory system 40 and a processor included in the host 20 can act as a master independently, then the controller 42 and the processor can secure required resources respectively. In this case, the resource management of the controller 42 and the host 20 may be determined according to rules supported by the serial communication (e.g., contention).

The operation information collected by the controller 42 may include type information of die structure and the number of dies in the memory device 44. For example, the type information of die structure may indicate that the memory device 44 is implemented with one of Single Die Package (SDP), Double Die Package (DDP), Quarter Die Package (QDP) and Octet Die Package (ODP). Based on the operation information, the size of memory area in the second memory 46, which is allocated for loading and storing the block management information, the erase count, the valid page count (VPC), and the mapping table, may be determined and varied.

When the controller 42 fails to allocate all the block management information, the erase count, the valid page count, and the mapping table, which have different sizes estimated by the controller 42 according to the operation information to the second memory 46, the controller 42 may further allocate some of the first memory 22 for supplementing a shortage portion. For example, the controller 42 may load some of the mapping information regarding the memory device 44 into the second memory 46 according to the operation information while loading the others of mapping information into the first memory 22 of the host 20.

Based on the collected operation information, the controller 42 can estimate resources required to handle or process the data and the command transferred from the host 20. In addition, the controller 42 can secure internal and external memory areas (e.g., the first memory 22, the second memory 46, etc.) and determine and allocate, based on the collected operation information, one or more of the internal and external memory areas for the collected operation information. At this time, the determination can be made according to a characteristic of data, a structure of the memory device 44 in the memory system 40, an operation status of the memory system 40, and the like.

Figure 8:
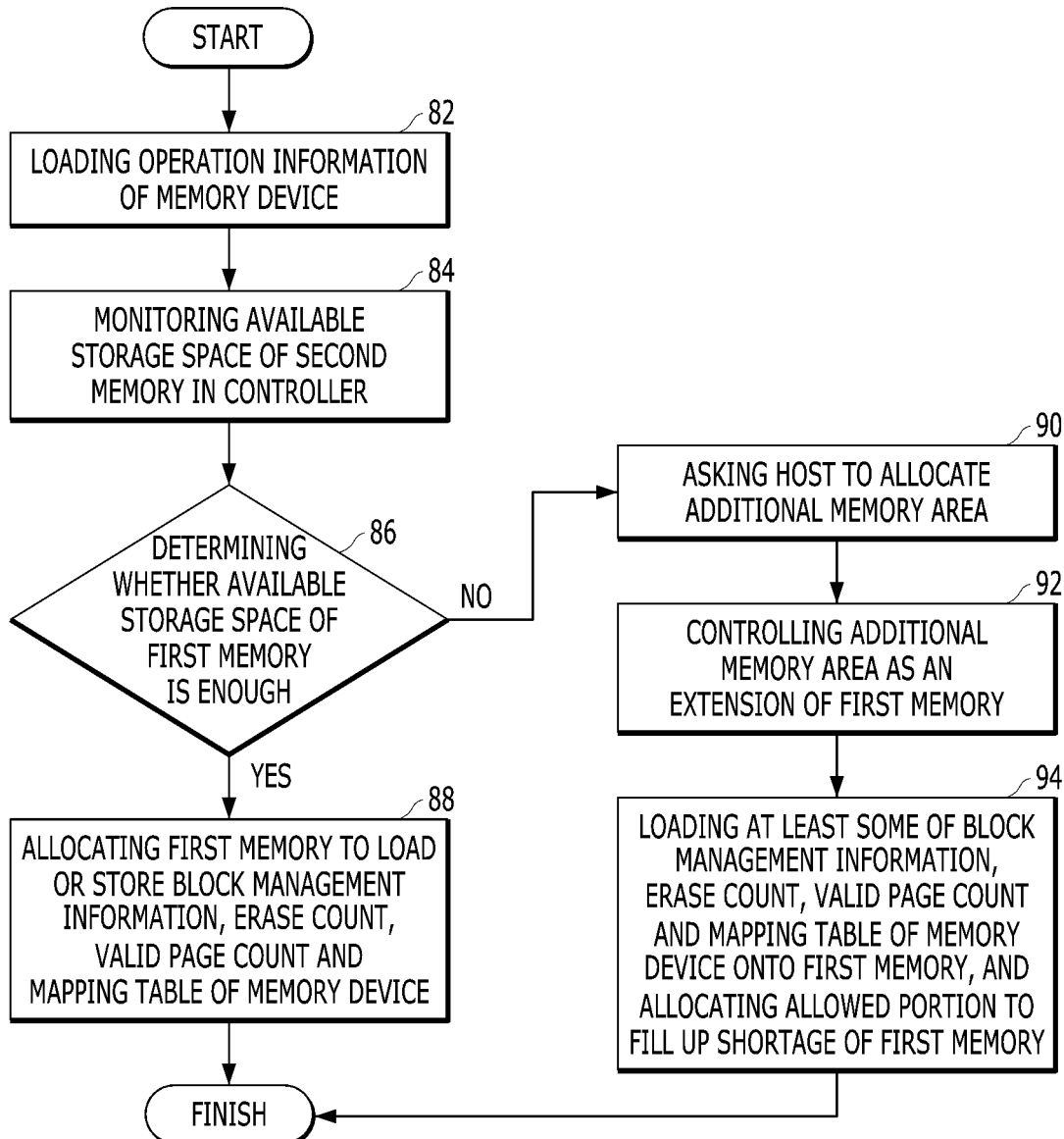
FIG. 8 a flowchart illustrating a control method of a data processing system in accordance with an embodiment of the disclosure.

In FIG. 8, an operation method of the data processing system in accordance with another embodiment of the disclosure is described. The data processing system can include the host 20 and the memory system 40, which are coupled with each other. The memory system 40 can be constituted with the controller 46 and the memory device 44 including plural dies 44_1 to 44_3, each having plural non-volatile memory cells.

Referring to FIG. 8, the method of operating the data processing system includes step 82 of loading operation information of the memory device 44, step 84 of monitoring an available storage space of the second memory 46 in the controller 42, and step 86 of determining whether the available storage space of the second memory 46 is enough for performing operations in response to commands. When it is determined that the available storage space of the second memory 46 is sufficient, the controller 44 can allocate the second memory 46 to load or store block management information, an erase count, a valid page count and a mapping table of the memory device at step 88. However, when the available storage space of the second memory 46 is not enough, the controller 44 can request the host 20 to allocate an additional memory area for operations in the memory system 20 at step 90. Based on the determination of the host 20, the controller 44 may control the additional memory area (e.g., some or parts of the first memory 22) as an extension of the second memory 46 at step 92. The controller 44 can load at least some of the block management information, the erase count, the valid page count and the mapping table of the memory device to the first memory, and allocate allowed portion of the first memory 22 to fill up a shortage of the second memory 46 at step 94.

Although not shown, step 92 of controlling the additional memory area (i.e., the first memory 22 of the host 20) as the extension of the second memory 46 of the controller 44 may include controlling the second memory 46 and the first memory 22 via a serial data communication. The serial data communication can be performed under at least one of the Universal Asynchronous Receiver Transmitter (UART), the Serial Peripheral Interface Bus (SPI), the Inter Integrated Circuit (I2C), and the Universal Serial Bus (USB).

In accordance with an embodiment, the operation information includes the number of dies included in the memory device 44 and type information of die structure. Based on the operation information, a memory area or a memory region allocated to load the block management information, the erase count, the valid page count and the mapping table can have a different size in the second memory 46 of the controller 42. The size of the memory area to be allocated can be varied, because information required for performing operations, e.g., the block management information, the erase count, the valid page count, and the mapping table, can have different sizes based on the structure of memory device 44. The controller 42 may estimate the size of the information required for performing operations based on the operation information. The controller 42 can monitor a status of the second memory 46, and determine whether an additional memory area of the first memory 22 within the host 20 is secured as an extended memory area for the second memory 46.

For example, the controller 42 can load some of the mapping information regarding the memory device onto the first memory, and loads the other mapping information onto the additionally secured memory space of the first memory 22 according to the operation information.

By way of example but not limitation, the type information of die structure may be one of Single Die Package (SDP), Double Die Package (DDP), Quarter Die Package (QDP) and Octet Die Package (ODP), depending on the number of dies.

As described above, the memory device may include a plurality of dies 44_1 to 44_3. Information necessary or required for performing foreground and background operations such as block management information, erase counts, valid page counts, and mapping tables regarding the memory device 44 can have different sizes due to an internal structure of the memory device 44. Based on the operation information including the number of dies 44_1 to 44_3 included in the memory device 44 and the type information of die structure, the controller 42 can estimate a size of a memory portion allocated for loading and storing the block management information, the erase counts, the valid page counts, and the mapping tables. Then, the controller 42 can dynamically allocate some or part of the first memory 22 of the host 20 to load the required information even though the first memory 22 is not included in the memory system 40, but associated or linked with the host 20.

Figure 9:
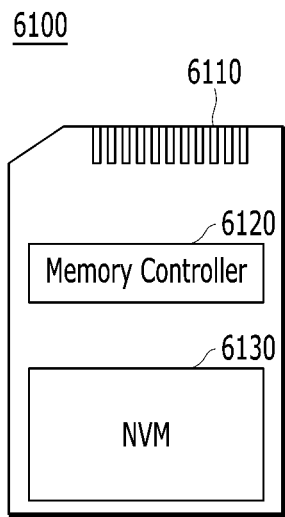
FIGS. 9 to 17 are diagrams schematically illustrating other examples of data processing systems including a memory system in accordance with an embodiment of the disclosure.

In FIG. 9, another example of the data processing system including the memory system in accordance with the embodiment is described. FIG. 9 schematically illustrates a memory card system to which the memory system in accordance with the embodiment is applied.

Referring to FIG. 9, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By way of example but not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 3, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIGS. 1 and 3.

The memory controller 6120 may communicate with an external device, for example, the host 102 of FIG. 1 through the connector 6110. For example, as described with reference to FIGS. 1 to 3, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (SU-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and a universal flash storage (UFS).

Figure 10:
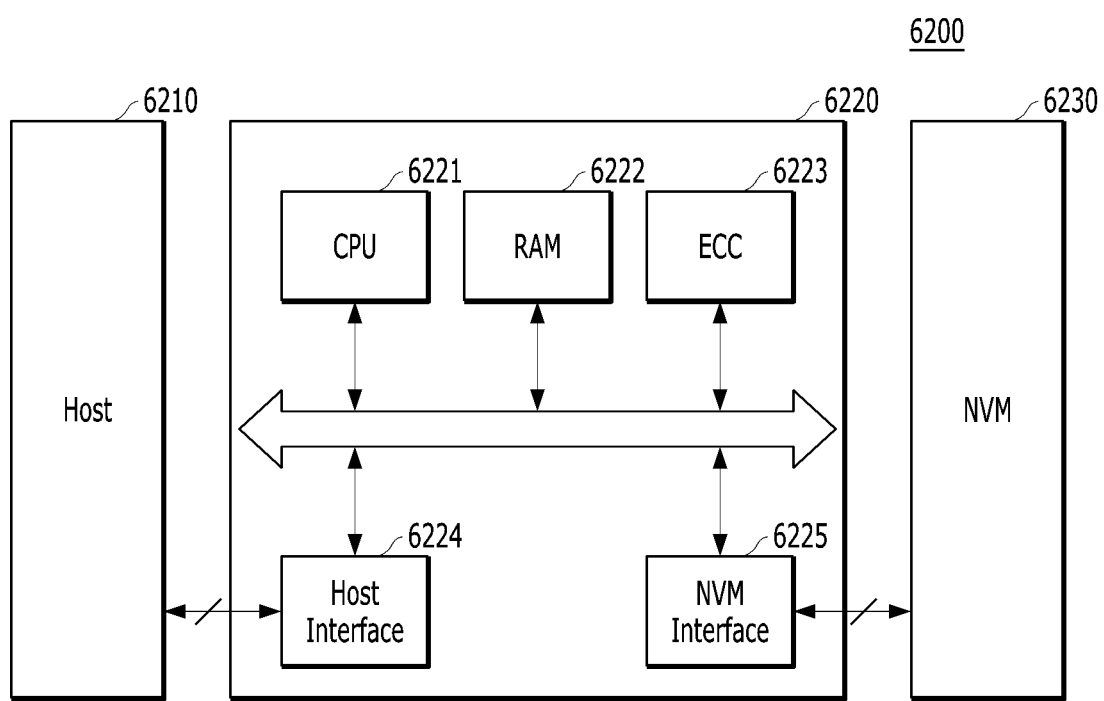

FIG. 10 is a diagram schematically illustrating another example of the data processing system including the memory system in accordance with the embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIGS. 1 and 2. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request made to the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. Particularly, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
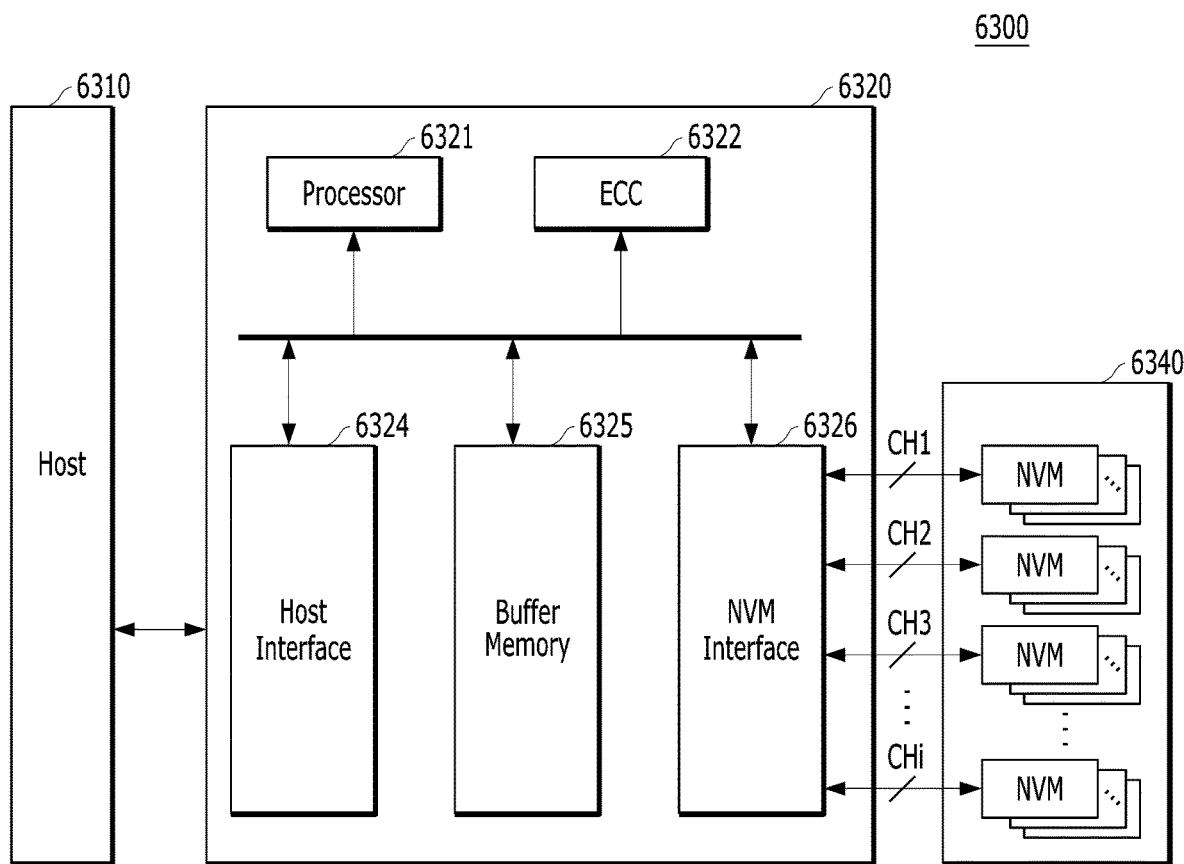

FIG. 11 is a diagram schematically illustrating another example of the data processing system including the memory system in accordance with the embodiment. FIG. 11 schematically illustrates an SSD to which the memory system in accordance with the embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 2. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 12:
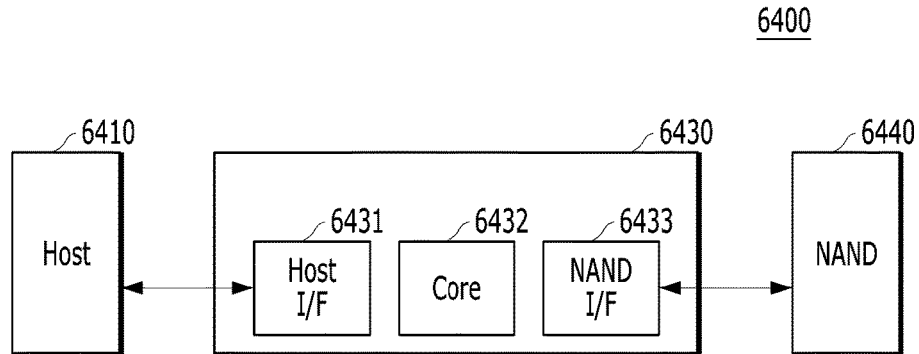

FIG. 12 is a diagram schematically illustrating another example of the data processing system including the memory system in accordance with the embodiment. FIG. 9 schematically illustrates an embedded Multi-Media Card (eMMC) to which the memory system in accordance with the embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 2. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 17 to 20 are diagrams schematically illustrating other examples of the data processing system including the memory system in accordance with the embodiment. FIGS. 17 to 20 schematically illustrate UFS (Universal Flash Storage) systems to which the memory system in accordance with the embodiment is applied.

Referring to FIGS. 17 to 20, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 13 to 16, and the UFS cards 6530, 6630, 6730, 6830 may be embodied in the form of the memory card system 6100 described with reference to FIG. 9.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 13:
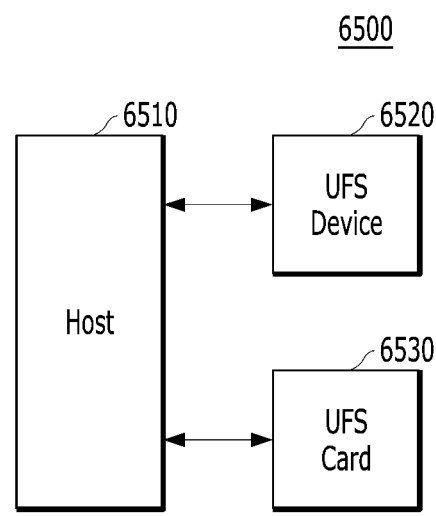

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410. The form of a star is an arrangement where a single centralized component is coupled to plural devices for parallel processing. A plurality of UFS cards may be connected in parallel or in the form of a star to the UFS device 6520 or connected in series or in the form of a chain to the UFS device 6520.

Figure 14:
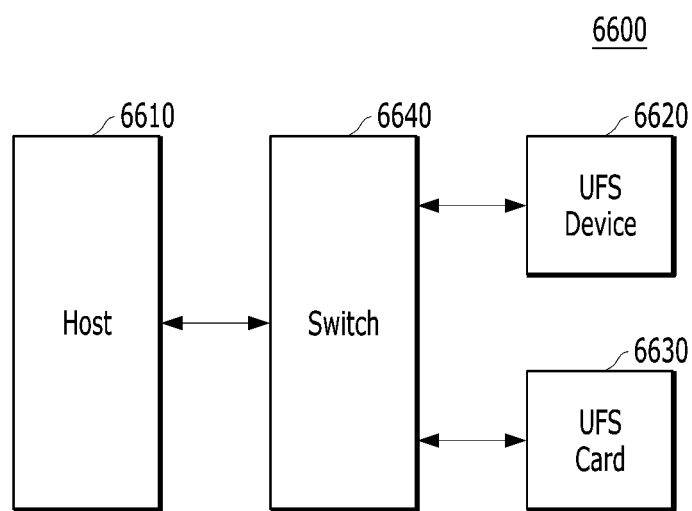

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
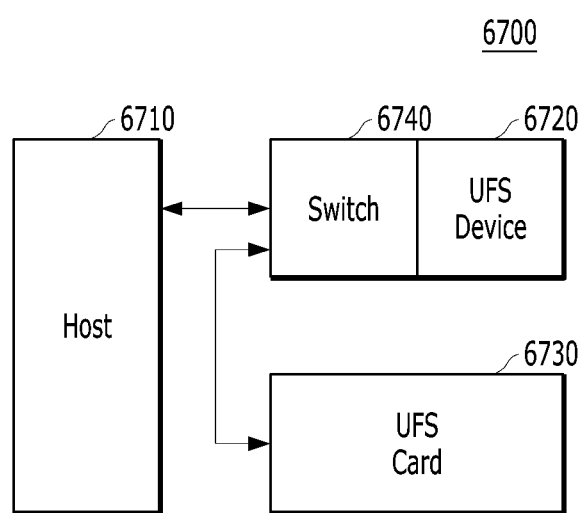

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
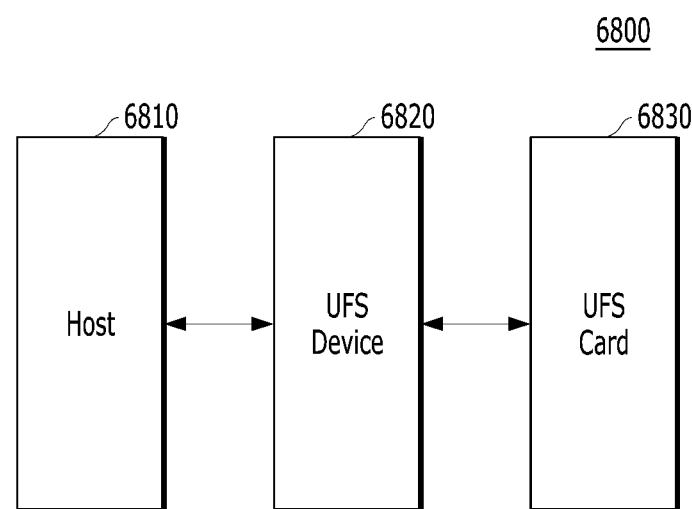

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
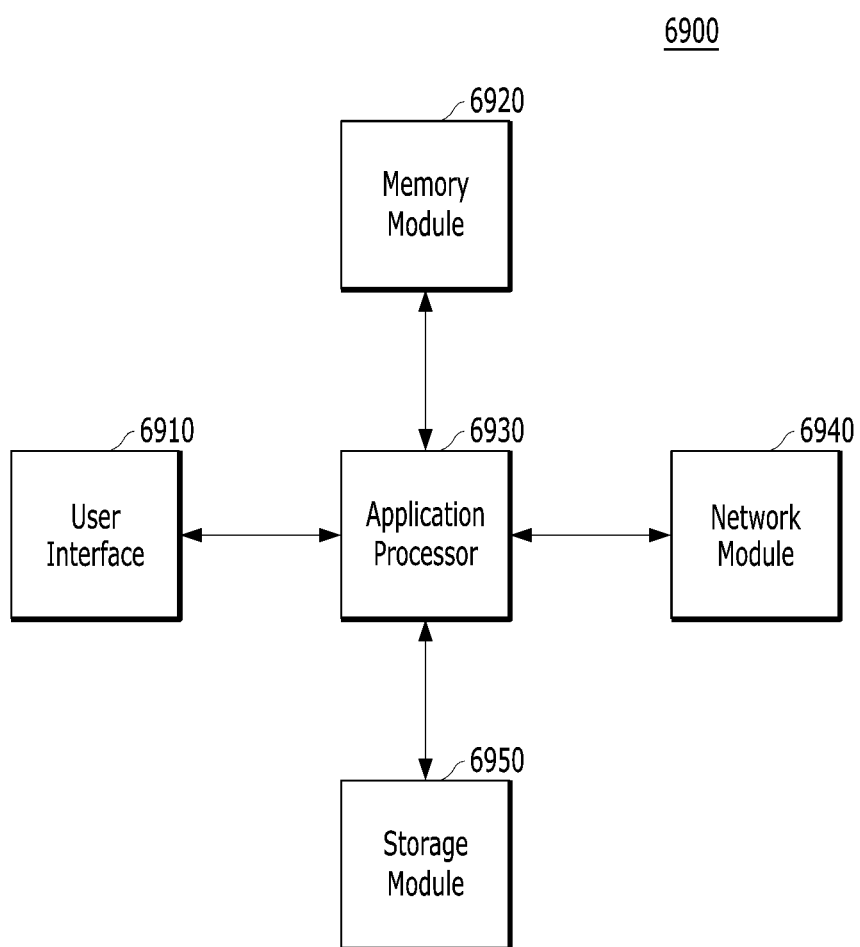

FIG. 17 is a diagram schematically illustrating another example of the data processing system including the memory system in accordance with an embodiment of the present invention. FIG. 17 is a diagram schematically illustrating a user system to which the memory system in accordance with the embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, an eMMC and an UFS as described above with reference to FIGS. 15 to 20.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

In accordance with the embodiments described above, a controller of the memory system can dynamically control memory allocation according to at least one of the number of dies, and cell type information of memory cells, included in the memory device. The controller can perform serial communication with a system memory area or a device interlocked with a host. When determining that a usable memory space in a memory arranged in the controller is not enough for performing an operation, the controller can utilize the system memory area or the interlocked device to allocate an additional memory space to the operation.

The disclosure discloses a controller or a control method for overcoming storage capacity limitation of a memory included in a memory system cooperating with a host, so that a fast and stable operation can be performed.

While the disclosure has been described with respect to the specific embodiments, it will be apparent to those skilled in the art that various changes and modifications may be made without departing from the spirit and scope of the invention as defined in the following claims.

What is claimed is:

1. A data processing system comprising:
a memory system including a memory device for storing data and a controller performing a data program operation or a data read operation with the memory device, wherein the memory device comprises a plurality of dies including non-volatile memory cells; and
a host suitable for requesting the data program operation or the data read operation from the memory system,
wherein the controller accesses a first memory which is arranged outside the memory system and engaged with the host,
wherein the controller comprises a second memory for loading operation information required for the data program operation or the data read operation, and mapping information of the memory device, and
wherein the operation information includes type information of die structure and the number of dies included in the memory device.

2. The data processing system according to claim 1, wherein the controller performs a serial communication to control a first memory which is arranged outside the memory system and engaged with the host.

3. The data processing system according to claim 2, wherein the serial communication is performed via at least one protocol of a MIPI M-PHY, a Universal Asynchronous Receiver Transmitter (UART), a Serial Peripheral Interface Bus (SPI) and an Inter Integrated Circuit (I2C).

4. The data processing system according to claim 3, wherein the controller plays a role as a master, and the first memory plays a role as a slave, in the serial communication.

5. The data processing system according to claim 4, wherein the host includes a processor which plays a role as another master in the serial communication.

6. The data processing system according to claim 1, wherein the second memory includes an allocated memory region for loading block management information, erase counts, valid page counts and mapping tables in the second memory, which has different sizes determined according to the operation information.

7. The data processing system according to claim 6, wherein, when all the block management information, the erase counts, the valid page counts and mapping tables are not loaded in the second memory having different sizes according to the operation information, the controller allocates a part of the first memory to make up a shortage of the second memory.

8. The data processing system according to claim 1, wherein the controller loads some of mapping information regarding a part of the non-volatile memory device in the second memory and loads the remainder of the mapping information in the first memory, based at least on the operation information.

9. The data processing system according to claim 1, wherein the type information of die structure includes one of a Single Die Package (SDP), a Double Die Package (DDP), a Quarter Die Package (QDP), and an Octet Die Package (ODP).

10. The data processing system according to claim 1, wherein the controller is configured to monitor available storage capacity of the second memory, request the host to use the first memory, which is included in the host, based on a monitoring result, and control the first memory as an extension of the second memory.

11. A memory system, comprising:
a memory device including a plurality of dies for storing data; and
a controller for performing a data program operation or a data read operation with the memory device in response to a request input from an external device, and loading operation information used for the data program operation or the data read operation in a first memory,
wherein the operation information includes type information of die structure and the number of dies included in the memory device.

12. The memory system according to claim 11, wherein the type information of die structure includes one of a Single Die Package (SDP), a Double Die Package (DDP), a Quarter Die Package (QDP), and an Octet Die Package (ODP).

13. The memory system according to claim 11, wherein the controller loads mapping information of the memory device in the first memory.

14. The memory system according to claim 11, wherein the controller performs a serial communication to control a second memory which is arranged outside the memory system and engaged with the external device.

15. The memory system according to claim 14, wherein the serial communication is performed via at least one protocol of a MIPI M-PHY, a Universal Asynchronous Receiver Transmitter (UART), a Serial Peripheral Interface Bus (SPI) and an Inter Integrated Circuit (I2C).

16. The memory system according to claim 14, wherein the first memory includes an allocated memory region for loading block management information, erase counts, valid page counts and mapping tables, which has different sizes determined according to the operation information.

17. The memory system according to claim 16, wherein, when all the block management information, the erase counts, the valid page counts and mapping tables are not loaded in the second memory having different sizes according to the operation information, the controller allocates a part of the second memory to make up a shortage of the first memory.

18. The memory system according to claim 14, wherein the controller loads some of mapping information regarding a part of the memory device in the first memory and loads the remainder of the mapping information in the second memory, based at least on the operation information.

19. The memory system according to claim 14, wherein the controller is configured to monitor available storage capacity of the first memory, request the external device to use the second memory, which is included in the host, based on a monitoring result, and control the second memory as an extension of the first memory.

* * * * *